3,402,156
REACTION PRODUCT OF POLYVINYLPHOS-
PHONIC DICHLORIDE AND GLYCEROL
Hans Bernhard Adolf Kramer, New York, N.Y., and
Gunter Messwarb, Kelkheim, Taunus, and Walter Denk,
Frankfurt am Main, Germany, assignors to Farbwerke
Hoechst Aktiengesellschaft vormals Meister Lucius &
Bruning, Frankfurt am Main, Germany, a corporation
of Germany
No Drawing. Original application Oct. 3, 1962, Ser. No.
228,011, now Patent No. 3,350,368, dated Oct. 31,
1967. Divided and this application July 17, 1967, Ser.
No. 664,581
Claims priority, application Germany, Sept. 25, 1956,
F 21,304; Sept. 26, 1956, F 21,318
1 Claim. (Cl. 260—80)

The present invention relates to polymers containing phosphorus. This application is a continuation-in-part of our copending application Ser. No. 685,811, now abandoned, filed Sept. 24, 1957, which, on its part, is a continuation-in-part of our copending application Ser. No. 684,438 filed Sept. 17, 1957, now U.S. Patent 3,105,064, also, this application 664,581 is a divisional application of 228,011 filed Oct. 3, 1962, now U.S. Patent 3,350,368.

It has already been proposed to polymerize or to copolymerize vinylphosphonic acid halides and the derivatives thereof with other copolymerizable compounds containing one or more olefinic bonds. As copolymerizable monomers there are used for example: a styrene or styrenes alkylated in the nucleus and/or in the side chain, for example by a $CH_3$- or $C_2H_5$-group, divinylbenzene, vinyl esters containing an acid radical with 1–18 carbon atoms which may be arranged in an open chain or in a cyclic manner; or vinyl chloride, vinylidene chloride, butadiene, acrylonitrile; or esters of acrylic or methacrylic acid with aliphatic monohydric straight or branched alcohols containing 1–4 carbon atoms. The aforesaid monomers which are free from phosphorus may be used individually or in combination. The proportion of vinylphosphonic acid halides and the derivatives thereof to the other copolymerization component or components may vary within wide limits, for example within the ranges of about 0.1 to 99.9 and 99.9 to 0.1. The products so obtained are very sensitive to moisture and decompose readily with evolution of gaseous hydrogen halide, a fact which may prove disadvantageous in industry, for example when these products are used as plastic material or as starting material for making plastic material.

The present invention provides novel and useful polymers containing phosphorus and represents a new and very advantageous method to prepare phosphorus containing polymers and copolymers.

We have found a new method of producing polymeric vinylphosphoric acid esters, thioesters and amides directly by reacting polymeric vinylphosphonic acid dichloride/ or dibromide, preferably polymeric vinylphosphonic dichloride, because this compound is more reactive and can be produced in a very economic way, with at least one organic compound having at least one active hydrogen atom. The preferred organic compounds having at least one active hydrogen atom are organic compounds containing at least one hydroxyl group and/or at least one sulfhydryl group, and/or at least one amino group. According to this invention a host of polymeric compounds can be obtained in a simple and very economic way.

As organic compounds suitable for the reaction with polymeric vinylphosphonic acid dichloride or polymeric vinylphosphonic acid dibromide there may be mentioned by way of example: alcohols such as monohydric or polyhydric aliphatic, cycloaliphatic, araliphatic alcohols containing 1–20 carbon atoms and in which alcohols the carbon chain may be interrupted by one or more hetero atoms, such as oxygen, sulfur or nitrogen, for example methanol, octanol, stearyl alcohol, ethylene glycol, 1,4-butane diol, glycerol, cyclohexanol, cyclohexane diol, benzyl alcohol or furfuryl alcohol. Instead of the aforesaid alcohols there may also be used the corresponding alcoholates. Furthermore, there may be used for example, monohydric or polyhydric mononuclear or polynuclear phenols which may be substituted, for example monochlorophenol, dibromonaphthol and also hydroxyquinones such as alpha- or beta-hydroxyanthraquinone, and mercaptans such as monohydric or polyhydric aliphatic, cycloaliphatic or araliphatic mercaptans containing 1–20 carbon atoms, in which the carbon chain may be interrupted by one or more hetero atoms such as oxygen, sulfur or nitrogen. The above mercaptans may be replaced by the corresponding mercaptides, for example alkali metal mercaptides. Furthermore, there may be used monohydric or polyhydric mononuclear or polynuclear thiophenols which may be substituted, for example monochlorothiophenol or dibromothionaphthol. Exemplary of further suitable compounds are enols, such as the enol form of acetic ester, acetyl acetone, and cyclohexane dione, and also the corresponding enolates for example with alkali metals; mono- or polyhydric silanols, such as trimethylsilanol, dimethylsilandiol or polysiloxanes containing one or more hydroxylic groups. There may also be used for example: ammonia, primary, secondary, mono- or polyvalent, aliphatic, cycloaliphatic, aromatic and araliphatic amines, for example proplyamine, diethylamine, trimethylamine, hexamethylene-diamine, cyclohexylamine, aniline, ortho-, meta- or para-phenylene-diamine; imines such as ethylene-imine, beta-ethylene-imino butyric acid glycol ester; amides for example formamide, formanilide, acetanilide, phthalimide, melamine, dicyandiamide, hydrazine and the substitution products thereof, for example phenyl hydroxyl-amine, and heterocyclic nitrogen compounds such as piperidine, imidazole or imidazoline.

If from the aforesaid compounds those are used that are polyfunctional, the reaction of this invention leads in most cases to cross-linked insoluble products; alternatively, if polymers are used as starting material which are already cross-linked to some extent, the degree of cross-linking of the said polymers is increased. There may also be used mixtures of these compounds. In this latter case modified polymers are obtained which contain various side chains or cross-linking bridges. The same result is obtained when the reaction is carried out in several stages using various compounds. Phosphatic polymers of a different composition may also be reacted in one reaction stage.

It is evident that the operability of the aforesaid steps makes the present process very flexible since on the base of one preformed polymer a very large number of further polymers can be prepared and thus the reaction products can be substantially adapted to the intended application in each case. When, for example, a polymeric vinylphosphonic acid dichloride is reacted with a mixture consisting of an alcohol and an amine, there are obtained different reaction products, depending on the composition of the alcohol/amine mixture, for example reaction products which contain many amide groups and a few ester groups only or products containing the two groups in a reversed proportion. It is likewise possible, of course, to prepare products which contain the respective groups in any proportion ranging between the aforesaid extreme cases.

The reaction of this invention is carried out advantageously at a temperature within the range of —50° and +200° C., preferably between —20° and +100° C., in the presence or absence of solvents, for example dialkyl ethers, such as diethyl ether, methylene chloride, acetone and, if desired, in the presence of catalysts.

Suitable catalysts are for example those accelerating the reaction of acid chlorides, such as hydroxides of bi- or poly-valent metals, for example barium hydroxide, lead hydroxide, aluminum hydroxide, metal oxides, for example cupric oxide or ferric oxide, and metal chlorides such as aluminum chloride or tin tetrachloride.

The reaction of this invention proceeds very rapidly and may entail a nearly quantitative separation of the halogen from the halogenated and phosphorated polymers used as starting materials.

The polymers modified according to this invention may serve as plastic material, flameproofing agents, textile auxiliary agents, for example antistatics, and as emulsifiers.

The following examples serve to illustrate the invention but they are not intended to limit it thereto:

Example 1

14.5 grams of polyvinylphosphonic acid dichloride were dissolved in 50 cc. of anhydrous acetone, and 1,4-butane diol was then added dropwise while stirring. After a short induction period, the reaction set in with strong evolution of gaseous hydrogen chloride and heat, which was completed while cooling. A white fibrous precipitate was obtained which solidified upon drying to yield a white horn-like mass which was absolutely insoluble in acetone. The product obtained had a chlorine content of 0.9%.

Example 2

14.5 grams of polyvinylphosphonic acid dichloride were dissolved in 50 cc. of anhydrous methylene chloride, and the resulting solution was intensely stirred with 6 grams of anhydrous glycerol while cooling with ice. After a short induction period, the mixture became warm, foamed with strong evolution of gaseous hydrogen chloride and formation of a white foam which solidified upon drying to yield a hard porous mass.

Example 3

70 grams of polyvinylphosphonic acid dichloride were dissolved in 200 cc. of anhydrous methylene chloride, and a solution of 50 grams of para-phenylene-diamine in 200 cc. of acetone was then added dropwise while stirring. A slightly orange colored precipitate separated immediately without evolution of gaseous hydrogen chloride; the precipitate was suction filtered and dried.

Example 4

100 grams of polyvinylphosphonic acid dibromide were dissolved in 500 cc. of anhydrous methylene chloride. While stirring, a solution of 100 grams of aniline in 300 cc. of acetone was then added dropwise. After complete precipitation of the reaction product, it was separated from the solution by filtration, washed with methylene chloride and dried.

Example 5

50 grams of polyvinylphosphonic acid dichloride were dissolved in 250 cc. of anhydrous methylene chloride. A mixture of 5 grams of anhydrous glycol and 10 grams of aniline—dissolved in 200 cc. of acetone—was added immediately to the polyvinylphosphonic acid dichloride solution under cooling conditions.

The precipitate was separated from the reaction medium, washed carefully with methylene chloride and dried.

We claim:

1. The reaction product of polyvinylphosphonic acid dichloride with glycerol at a temperature between −50° C. and 200° C. with substantially complete replacement of all halide groups.

References Cited

UNITED STATES PATENTS 3,350,368   10/1967   Kramer et al. _____ 260—80

JOSEPH L. SCHOFER, *Primary Examiner.*

C. A. HENDERSON, *Assistant Examiner.*